July 25, 1939.   S. A. GUERRIERI   2,167,025
FRACTIONATING COLUMN
Filed Aug. 21, 1935   2 Sheets-Sheet 1

Witness
Paul F. Bryant

Inventor
Salvatore A. Guerrieri
by his attorneys
Fish Hildreth Cary & Jenny

Patented July 25, 1939

2,167,025

UNITED STATES PATENT OFFICE 2,167,025

FRACTIONATING COLUMN

Salvatore A. Guerrieri, Mount Vernon, N. Y., assignor to The Lummus Company, New York, N. Y., a corporation of Delaware Application August 21, 1935, Serial No. 37,136

2 Claims. (Cl. 196—94)

The present invention relates to fractionating columns.

In the fractionation of petroleum, provision is usually made for withdrawal of an overhead distillate and one or more stripped side streams. The side streams may be obtained from side stripping sections of the general type shown in the Snell Reissue Patent No. 18,722, or from external stripping columns. Internal stripping sections, as ordinarily made, increase the height of the column while the external stripping columns add considerably to the cost of the equipment.

The object of the present invention is to provide a fractionating column having internal side stripping sections which may be constructed without adding materially to the size or cost of the equipment, as compared with a simple rectifying column.

With this object in view, a feature of the present invention contemplates the use of partitions dividing one or more portions of the column below the top thereof into adjacent sections, one of which includes rectifying decks for the main stream of vapors and the other of which includes the stripping decks. This may be accomplished without increasing the height of the column and without introducing additional back pressure against the vapors, as will hereinafter be explained.

A further feature of the invention comprises a vacuum fractionating column in which the stripping sections are disposed at the bottom of the shell adjacent to the bottoms stripping section.

Figure 2:
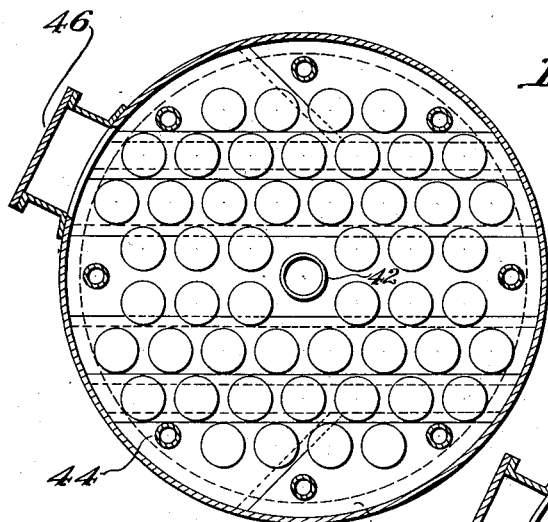
Figure 3:
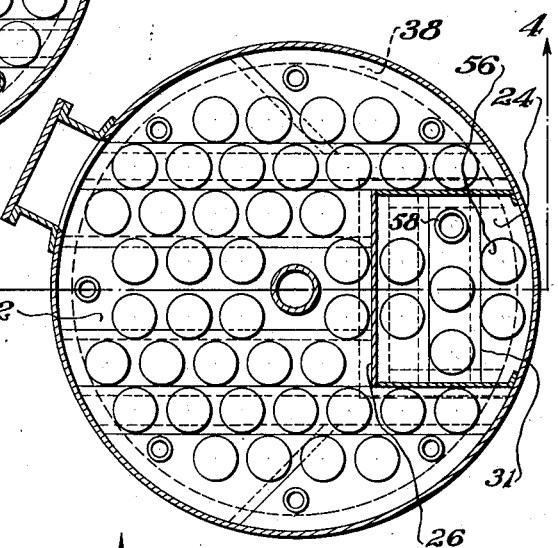
Figure 5:
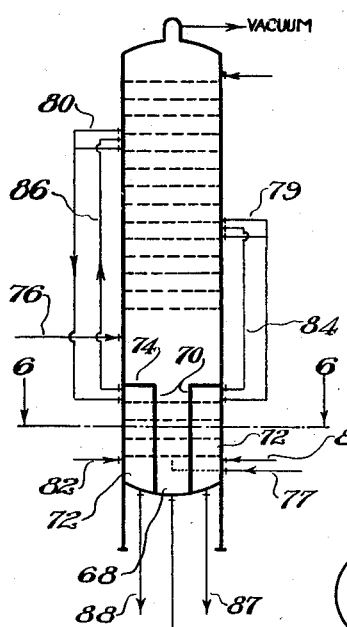
Figures 1, 6:
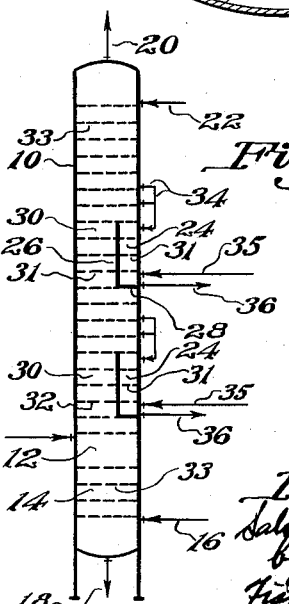
Figure 4:
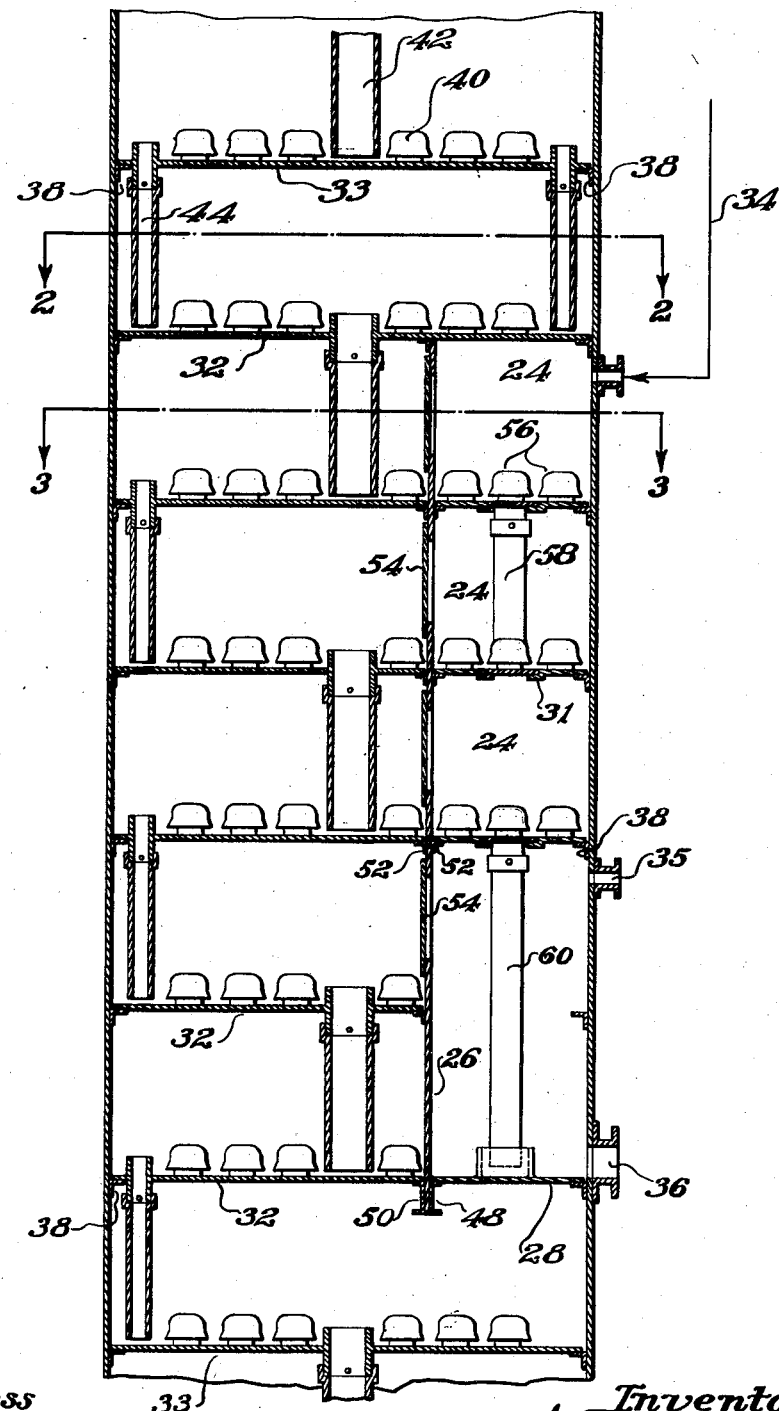

In the accompanying drawings, Fig. 1 is a diagrammatic elevation of one form of the invention; Figs. 2 and 3 are horizontal sectional views on lines 2—2 and 3—3 of Fig. 4, respectively; Fig. 4 is a vertical sectional elevation on line 4—4 of Fig. 3; Fig. 5 is a diagrammatic elevation of a modified form of the invention applied to a vacuum distilling column; and Fig. 6 is a section on line 6—6 of Fig. 5.

The column 10 shown in Fig. 1 is adapted for fractionation of a heated feed introduced into the flashing zone 12. The column is provided with a plurality of decks which may be of the conventional boiling cap type, illustrated as dash lines in the diagram. The column is provided with a bottoms stripping sections 14 into which steam is introduced at 16, the residual product being withdrawn at 18. Vapors are taken off overhead at 20 to be condensed in any suitable manner and condensate is returned as reflux into the top of the column at 22.

At different points above the point of feed, the column is provided with internal stripping sections 24 enclosed within vertical partitions 26 and imperforate horizontal deck portions 28. The stripping sections 24 and the vapor spaces 30 adjacent thereto are provided with boiling cap decks 31 and 32 respectively, and the other portions of the column are provided with decks 33 of circular form.

Descending liquid is drawn off one or more decks above each stripping section by pipes 34 and conveyed into the top of the corresponding stripping section. Steam is introduced into the bottom of each stripping section, as indicated at 35, and draw-offs 36 are provided for removal of stripped side products.

The construction of the preferred type of column is shown in Figs. 2, 3 and 4. As shown in Figs. 2 and 4, each full deck 33 is supported on an angle 38 secured to the internal wall of the shell. These decks are provided with boiling caps 40, and center and rim down pipes 42 and 44. The decks are made up of overlapping cast iron sections which may be introduced through the manholes 46.

The decks 31 and 32 are preferably made up as composite decks, also in sectional form, and supported peripherally by angles 38. The imperforate deck 28, that is, the lowermost deck of each stripping section, is supported on the angle 38 and a channel 48 extending across the column. The deck 32 adjacent thereto is supported on the angle 38 and a channel 50 opposed to the channel 48. The vertical partitions 26 are secured to the channel 48. As shown in Fig. 3, these partitions form a box-like structure segregated from the remainder of the column.

The decks 31 of the stripping section, as well as the corresponding main decks 32, are supported on angles 52 secured to the vertical partitions. The decks 32 are in sectional form, similar to the full decks 33, except where the pattern is broken by the presence of the stripping section. The stripping decks 31 are of simple sectional form, the sections being introduced through suitable openings which are finally closed by cover plates 54. The stripping decks are provided with boiling caps 56, and also with down pipes 58 which are alternately disposed at opposite ends of the section.

It will be noted that in the construction of Fig. 4, a stripping deck is omitted and a long down pipe 60 extends to the imperforate deck 28.

This arrangement is illustrative of the flexibility of the design since it permits use of any desired number of stripping decks in a unit of substantially standard construction.

In operation, the vapors flashed in the zone 12, together with vapors and steam rising from the bottoms stripping section, rise through the rectifying decks 32 and 33 to contact with descending reflux. A portion of the reflux is passed into the stripping sections 24, in which it is contacted with steam. The steam and vapors pass direct into the main rectifying decks above the stripping sections, and the stripped side products are removed at the draw-off points 36.

By the present invention, the stripping sections are included within the confines of the cylindrical column and therefore require no external structural support. Furthermore, a part of the main rectifying action of the column is permitted to take place alongside the stripping sections and without any reduction in the effective area of the column. The greatest volume of vapors occurs on the decks 33 in the upper section of the column, and the volume diminishes toward the point of introduction of the feed. Accordingly, although the actual area of the column is reduced adjacent to the stripping section, the area per unit volume of vapors is as great as that afforded by the full deck sections. Consequently, the column size may be figured on the volume of vapors handled in the top of the column and the stripping sections may be introduced without any increase in equipment and with only small increase in cost over a conventional tower without stripping sections.

The construction shown diagrammatically in Figs. 5 and 6 is particularly adapted for vacuum distillation. In a vacuum column, the bottoms stripping section is generally constructed to give higher velocity of vapors and liquid than in the remainder of the column, for the purpose of promoting more efficient contact between vapor and liquid. This is usually accomplished by reducing the size of the bottoms stripping section. According to the present invention, the column is made of the same diameter throughout and the bottoms stripping section 68 is enclosed between vertical partitions 70, thus forming segmental spaces 72 which are used as stripping sections for side products. The sections 72 are closed at the top by imperforate horizontal decks 74. The deck plan is shown in Fig. 6.

The heated feed is charged to the column at 76. The portion of the feed that is not vaporized is stripped in the section 68 by steam introduced at 77, and a residual product is withdrawn at 78. The vapors are rectified by descending reflux in the upper part of the column.

Liquid reflux is drawn off at 79 and 80 from suitable decks in the upper part of the column and conveyed to the individual stripping sections 72 into which steam is admitted at 82. The vapor mixtures of oil and steam are conveyed by vapor pipes 84 and 86 respectively, into the upper part of the column preferably adjacent to the draw-off points 79 and 80. The side products are withdrawn at 87 and 88 to be pumped to the storage tanks.

The construction of Figs. 5 and 6 requires pumping of the liquids out of the side stripping sections and is particularly suitable for vacuum columns, out of which the side streams must be pumped in any event. When the conditions permit gravity flow, however, the construction of Fig. 1 may be preferred.

Having thus described the invention, what is claimed is:

1. A fractionating column comprising a shell having a rectifying section, a vertical partition in the bottom of the shell forming a bottoms stripping section on one side thereof and a side stripping section on the other side thereof, means for introducing charge material between the rectifying section and the bottoms stripping section, means for withdrawing a side stream from the rectifying section and passing it to the side stripping section, means for conducting vapors from the side stripping section to the rectifying section, means for withdrawing a residual material from the bottoms stripping section, and means for withdrawing a side product from the side stripping section.

2. A fractionating column comprising a shell having a rectifying section, vertical partitions in the bottom of the shell dividing the shell into a bottoms stripping section and a plurality of side stripping sections, means for introducing charge material between the rectifying section and the bottoms stripping section, means for withdrawing side streams from different parts of the rectifying section and passing them into the respective side stripping sections, means for conducting vapors from the side stripping sections to the rectifying section, means for withdrawing a residual material from the bottoms stripping section, and means for withdrawing side products from the side stripping sections.

SALVATORE A. GUERRIERI.